United States Patent
Dos Santos Freire et al.

(10) Patent No.: US 11,708,475 B2
(45) Date of Patent: Jul. 25, 2023

(54) METHOD FOR PREPARING MODIFIED FILLER, COMPOSITIONS AND ARTICLES CONTAINING SAME

(71) Applicant: PPG Industries Ohio, Inc., Cleveland, OH (US)

(72) Inventors: Lucas Dos Santos Freire, Pittsburgh, PA (US); Sik Boen, Moseley, VA (US); Nathan J. Silvernail, Mars, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 295 days.

(21) Appl. No.: 17/121,912

(22) Filed: Dec. 15, 2020

(65) Prior Publication Data
US 2021/0189096 A1    Jun. 24, 2021

Related U.S. Application Data

(60) Provisional application No. 62/950,494, filed on Dec. 19, 2019.

(51) Int. Cl.
*C08K 3/36* (2006.01)
*C08K 5/548* (2006.01)
*C08L 21/00* (2006.01)

(52) U.S. Cl.
CPC ............. *C08K 3/36* (2013.01); *C08K 5/548* (2013.01); *C08L 21/00* (2013.01)

(58) Field of Classification Search
CPC ............ C08K 3/36; C08K 5/548; C08L 21/00

USPC ..................................................... 524/492
See application file for complete search history.

(56) References Cited

U.S. PATENT DOCUMENTS

| | | | |
|---|---|---|---|
| 5,780,538 A | 7/1998 | Cohen et al. | |
| 6,197,384 B1 | 3/2001 | Schubert et al. | |
| 2006/0084746 A1* | 4/2006 | Bice | C08K 9/06 |
| | | | 524/493 |

FOREIGN PATENT DOCUMENTS

| | | |
|---|---|---|
| EP | 1208165 A1 | 12/2007 |
| WO | WO-2006065578 A2 | 6/2006 |

* cited by examiner

*Primary Examiner* — Deve V Hall
(74) *Attorney, Agent, or Firm* — Krisanne Shideler

(57) ABSTRACT

Provided is a method for preparing a modified filler. The method includes in sequence providing an acidified aqueous slurry of an untreated inorganic filler which has not been previously dried; an emulsifier material; and a hydrophobating agent having the following structural formula (I):

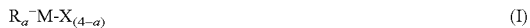

$$R_a\text{-}M\text{-}X_{(4-a)} \tag{I}$$

wherein:
R is $C_6$ to $C_{22}$ alkyl,
M is silicon, titanium or zirconium,
X is OR' or halogen,
R' is $C_1$ to $C_4$ alkyl, and
a is 1;

washing and/or filtering the acidified aqueous slurry to obtain a modified filler; and, optionally, drying the modified filler. Polymeric compositions and articles also are provided.

15 Claims, No Drawings

METHOD FOR PREPARING MODIFIED FILLER, COMPOSITIONS AND ARTICLES CONTAINING SAME

CROSS-REFERENCE TO RELATED APPLICATION

This application claims the benefit of priority from U.S. Provisional Application No. 62/950,494, filed Dec. 19, 2019, which is incorporated by reference herein in its entirety.

FIELD OF THE INVENTION

The invention relates to a method for preparing modified fillers, particularly modified fillers useful as components in polymeric compositions.

BACKGROUND OF THE INVENTION

The present invention relates to a method for preparing modified inorganic fillers, the modified fillers prepared by the method, and the use of such fillers in polymeric compositions. More particularly, this invention relates to particulate or amorphous fillers having minimum carbon and sulfur contents, a maximum extractable carbon content and polymers, e.g., curable rubber compositions, containing such fillers. Most particularly, this invention relates to a functionalized and hydrophobated filler, hereinafter referred to as a "modified filler", that improves the efficiency of producing polymeric compositions, such as rubber compounding compositions, and the performance of polymerized or cured products, e.g., tires.

In the production of polymeric compositions, it is common to incorporate fillers to improve the physical properties of the polymer. The surfaces of such fillers are often modified to increase the reactivity and consequently the two- and three-dimensional coupling of the filler within the polymeric composition. It is conventional in the rubber industry to incorporate carbon black and other reinforcing fillers into natural and synthetic rubber to increase the physical properties of the cured rubber vulcanizate. Fillers used to reinforce such polymeric compositions include natural and synthetic fillers. One of the principal non-black fillers used in the rubber industry is amorphous precipitated silica. This siliceous filler is used to impart improved tensile strength, tear resistance and abrasion resistance to the rubber vulcanizate.

Silica fillers are also used in combination with carbon blacks to obtain maximum mileage in passenger vehicle tires and off-the-road tires, e.g., tires for mining and logging operations and for road-building equipment. Such applications have become well established. When used as the sole reinforcing filler, silica fillers that are not well dispersed and/or coupled in the rubber do not provide the overall improved performance obtained by the use of carbon blacks alone. This is observed most readily in rubber vulcanizes used for tires, e.g., tire treads.

Various coupling agents, e.g., titanates, zirconates and silanes, have been suggested for use with fillers when such fillers are incorporated into polymeric compositions, such as rubber, in order to improve the performance of the rubber vulcanizate. Among the various organosilane coupling agents known for such use are the bis(alkoxysilylalkyl) polysulfides, e.g., 3,3'-bis(triethoxysilylpropyl)tetrasulfide. It has been reported that the use of appropriate amounts of such coupling agents, particularly 3,3'-bis(triethoxysilylpropyl)tetrasulfide, in siliceous filler reinforced synthetic rubbers provides at least equivalent performance to carbon black-reinforced synthetic rubbers in several key physical properties, such as 300% modulus, tensile strength and abrasion resistance.

U.S. Pat. No. 4,436,847 describes increasing the efficiency of silane coupling agents, e.g., bis(alkoxysilylalkyl) polysulfide coupling agents, by using an alkoxysilane in combination with the silane to form a coupling composition. In one specific embodiment described therein, the silane coupling composition is formulated with the siliceous filler in a suitable nonreactive liquid that is chemically inert with respect to the coupling composition and siliceous filler to prepare a rubber compounding additive, i.e., a silica-silane concentrate.

U.S. Pat. No. 5,116,886 describes a two-step process in which the surface of natural or synthetic oxide or silicate fillers is modified by using certain organosilicon compounds. In the first step, the organosilicon compound is mixed intensely with the filler at a temperature below 60° C. In the second step, the homogenous mixture is subjected to a temperature of from 60° C. to 160° C. to complete the surface modification of the filler.

U.S. Pat. No. 5,908,660 also describes a two-step method for the preparation of hydrophobic silica. In the first step, an aqueous suspension of precipitated silica is contacted with an organosilicon compound in the presence of a catalytic amount of an acid to effect hydrophobating of the precipitated silica. In the second step, the aqueous suspension of the hydrophobic precipitated silica is contacted with a water immiscible organic solvent at a solvent-to-silica weight ratio greater than 5:1 to effect separation of the hydrophobic precipitated silica from the aqueous phase.

U.S. Pat. No. 6,342,560 describes a modified filler that is characterized by a carbon content of greater than 1 weight percent, a sulfur content of greater than 0.1 weight percent, a Silane Conversion Index of at least 0.3, and a Standard Tensile Stress @ 300% elongation of 7 or more, by utilizing a certain combination of functionalizing and hydrophobating agents in an aqueous suspension of inorganic oxide having a pH of 2.5 or less. The acidic aqueous suspension of modified fillers is treated with acid neutralizing agents to increase the pH of the suspension to a range of from 3.0 to 10.

Notwithstanding the foregoing, methods disclosed in the prior art fail to obtain optimized properties. Hydrophobating agents currently used generally are not covalently bound to the silica. This causes difficulties in the characterization of the silica, and can result in the release of the hydrophobating agent during processing or mixing, thereby compromising the final rubber compound properties.

It has now been discovered that the process to produce a modified filler can be improved. This improvement can result in a modified silica which is characterized by a small amount of carbon extractables. In this invention, an emulsifier is used during the silica precipitation. The emulsifier allows the long chain silanes (i.e., the hydrophobating agents) to dissolve/disperse in the silica slurry more easily and facilitates efficient reaction of the coupling and hydrophobating agents with the filler. Previously, alkoxysilanes with long alkyl chains were not added in early stages of the silica precipitation because they are not water soluble. It has now been found that fillers treated with long chain silanes can be produced if a small amount of emulsifier is used to solubilize the long-chain silanes in the aqueous inorganic filler slurry. The ability to bind the long chain silanes to the inorganic filler results in improved compatibility with the polymeric matrix into which the modified filler is incorporated. The modified filler produced by this method provides processing and performance benefits over treated fillers produced by known methods.

The improved process provides a modified filler which provides improved reinforcement of the rubber composition into which it is incorporated. Improved reinforcement translates into better mechanical durability of the resulting rubber product as evidenced by increased tear strength, hardness and abrasion resistance.

SUMMARY OF THE INVENTION

The present invention is directed to a method for preparing a modified filler, the method comprising, generally in sequence:

(a) providing an acidified aqueous slurry comprising:
  (1) an untreated inorganic filler which has not been previously dried;
  (2) an emulsifier material; and
  (3) a hydrophobating agent having the following structural formula (I):

$$R_a\text{-}M\text{-}X_{(4-a)} \quad (I)$$

wherein:
R is $C_6$ to $C_{22}$ alkyl,
M is silicon, titanium or zirconium,
X is OR' or halogen,
R' is $C_1$ to $C_4$ alkyl, and
a is 1;

(b) washing and/or filtering the acidified aqueous slurry of (a) to obtain a modified filler; and
(c) optionally, drying the modified filler.

A filler prepared by the method, compositions, and articles containing the filler also are provided.

DETAILED DESCRIPTION OF THE INVENTION

For the purposes of this application, unless otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

All numerical ranges herein include all numerical values and ranges of all numerical values within the recited ranges. Notwithstanding the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

As used herein and in the claims in reference to filler (i.e., modified filler), the term "not been previously dried" means filler that has not been dried to a moisture content of less than 20 percent by weight. Further, untreated filler for use in the present invention does not include filler that has been previously dried to a moisture content of less than 20 percent by weight and rehydrated.

As used herein and in the claims, the term "filler" generally means an inorganic filler, such as an inorganic oxide that can be used in a polymer composition to essentially improve at least one property of said polymer composition and/or the polymeric matrix resulting therefrom, such as but not limited to electrical resistance (ER10), wear resistance, and puncture resistance. As used herein and in the claims, the term "untreated filler" means a filler that has not been treated with a treating material in an amount of greater than 1% by weight of the filler. As used herein and in the claims, the term "slurry" means a mixture including at least filler and water.

As used herein, the term "coupling agent" means a reactive chemical which can cause an inorganic oxide to be covalently bonded to the polymeric composition in which it is used. As used herein, the term "emulsifier" means a substance which stabilizes a hydrophobic substance in water. As used herein, the term "hydrophobating agent" means a chemical which can bind to and/or be associated with an inorganic oxide to the extent that it causes a reduction in the inorganic oxide's affinity for water while increasing the inorganic oxide's affinity for the organic polymeric composition in which it is used.

The present invention provides a method for preparing a modified filler, the method comprising in sequence:

(a) providing an acidified aqueous slurry comprising:
  (1) an untreated inorganic filler which has not been previously dried;
  (2) an emulsifier material; and
  (3) a hydrophobating agent having the following structural formula (I):

$$R_a\text{-}M\text{-}X_{(4-a)} \quad (I)$$

wherein:
R is $C_6$ to $C_{22}$ alkyl,
M is silicon, titanium or zirconium,
X is OR' or halogen,
R' is $C_1$ to $C_4$ alkyl, and
a is 1;

(b) washing and/or filtering the acidified aqueous slurry of (a) to obtain a modified filler; and
(c) optionally, drying the modified filler.

The untreated inorganic filler (1) (which has not been previously dried) used to prepare the modified filler in the method of the present invention can be an inorganic oxide defined herein as any inorganic particulate or amorphous solid material which possesses either oxygen (chemisorbed or covalently bonded) or hydroxyl (bound or free) at its exposed surface. In addition, the inorganic oxide is a material which is suitable for use in the various molding, compounding or coating processes including injection molding, lamination, transfer molding, compression molding, rubber compounding, coating (such as dipping, brushing, knife coating, roller coating, silk screen coating, printing, spray coating and the like), casting, and the like.

The inorganic oxide (or mixture of two or more inorganic oxides) used in the method of the present invention may be natural or synthetic. Such fillers can include oxides of the metals in Periods 2, 3, 4, 5 and 6 of Groups Ib, IIb, IIIa, IIIb, IVa, IVb (except carbon), Va, VIa, VIIa and VIII of the Periodic Table of the Elements in Advanced Inorganic Chemistry: A Comprehensive Text by F. Albert Cotton et al, Fourth Edition, John Wiley and Sons, 1980. Among the natural silicates, kaolines or clays are especially suitable.

However, kieselguhr or diatomaceous earths can also be used. Aluminum oxide, aluminum hydroxide or aluminum trihydrate and titanium dioxide, which can be obtained from natural deposits, can be named by way of example as fillers. Especially suitable synthetic fillers are aluminosilicates, silicates, pyrogenic, colloidal and precipitated silicas.

The term "aluminosilicates" can be described as natural or synthetic materials where the silicon atoms of a silicon dioxide are partially replaced, or substituted, either naturally or synthetically, by aluminum atoms. For example, 5 to 90 percent, such as 10 to 80 percent, of silicon atoms of a silicon dioxide might be replaced, or substituted, naturally or synthetically, by aluminum atoms to yield an aluminosilicate. A suitable process for such preparation might be described, for example, as by a co-precipitation by pH adjustment of a basic solution, or mixture, of silicate and aluminate also, for example, by a chemical reaction between $SiO_2$ groups, i.e., silanol groups, on the surface of a silicon dioxide, and $NaAlO_2$. For example, in such a co-precipitation process, the synthetic co-precipitated aluminosilicate may have 5 to 95 percent of its surface composed of silica moieties and, correspondingly, 95 to 5 percent of its surface composed of aluminum moieties.

Examples of natural aluminosilicates include Muscovite, Beryl, Dichroite, Sepiolite and Kaolinire. Examples of synthetic aluminosilicates include Zeolite and those which might be represented by formulas such as, for example, $[(Al_2O_3)_x(SiO_2)_y \cdot (H_2O)_z]$; $[(Al_2O_3)_x(SiO_2)_y YO]$; wherein Y is magnesium or calcium.

The inorganic oxide used in the method of the present invention can be selected from the group consisting of aluminosilicate, colloidal silica, precipitated silica or mixtures thereof. The inorganic oxide can be a precipitated silica of the type commonly employed for compounding with rubber.

The precipitated silica used in the method of the present invention to produce the modified filler may be produced, for example, by acidic precipitation from solutions of silicates, e.g., sodium silicate. The method of preparing the precipitated silica is not limiting to the present invention and will depend upon the desired properties of the silica, such as surface area and particle size required for a given application.

The BET surface area of the precipitated silica used in preparing the modified silica of the present invention will generally range from 50 $m^2/g$ to 1000 $m^2/g$, such as from 100 $m^2/g$ to 500 $m^2/g$.

The precipitated silica used to form the modified filler may be in the form of an aqueous suspension from production stages that precede the drying step, such as a slurry formed during precipitation or as a re-liquefied filter cake. The concentration of hydrophilic precipitated silica in the aqueous and/or organic suspension is not critical and can be within a range of about 1 to 90 weight percent, such as from 1 to 50 weight percent, or from 1 to 20 weight percent.

As mentioned previously, the acidified aqueous slurry also comprises an emulsifier material (2). Non-limiting examples of suitable emulsifier materials can include, but are not limited to, fatty acids and salts of fatty acids that can be substantially soluble or substantially emulsifiable in water, such as those having the general formula:

$$Z^+\text{—}O^-\text{—}CO\text{—}R^1,$$

wherein Z represents H, Na, K, Li or $NH_4$, and $R^1$ represents straight chain or branched $C_5$ to $C_{22}$ alkyl; and alkyl sarcosinic acids and salts of alkyl sarcosinic acids, such as those having the general formula $$Z^+\text{—}O^-\text{—}CO\text{—}CH_2\text{—}NC\text{—}CO\text{—}R^1,$$

wherein Z represents H, Na, K, Li or $NH_4$, and $R^1$ represents straight chain or branched $C_5$ to $C_{22}$ alkyl. For example, the emulsifier material (2) can be selected from the group consisting of salts of fatty acids, alkyl sarcosinates, salts of alkyl sarcosinates, and mixtures thereof.

Further non-limiting examples of suitable emulsifier materials for use in the present invention can include sodium stearate, ammonium stearate, ammonium cocoate, sodium laurate, sodium cocyl sarcosinate, sodium lauroyl sarcosinate, sodium soap of tallow, sodium soap of coconut, sodium myristoyl sarcosinate, stearoyl sarcosine acid, and mixtures thereof.

Mixtures of any of the aforementioned emulsifier materials can be used. The emulsifier material (2) can be present in the aqueous slurry in an amount ranging from greater than 0 percent up to and including 0.25 percent, where weight percentages are based on grams of emulsifier in grams of slurry. For example, the emulsifier material (2) can be present in the aqueous slurry in an amount ranging from 0.05 weight percent to 0.1 weight percent, where weight percentages are based on grams of emulsifier in grams of slurry.

As previously mentioned, the acidified aqueous slurry used in the method of the present invention also comprises (3) a hydrophobating agent having the following structural formula (I):

$$R_a\text{-}M\text{-}X_{(4-a)} \qquad (I)$$

wherein:
R is $C_6$ to $C_{22}$ alkyl, such as $C_8$ to $C_{20}$,
M is silicon, titanium or zirconium,
X is OR' or halogen,
R' is $C_1$ to $C_4$ alkyl, such as $C_1$ to $C_2$, and
a is 1.

For example, in structural formula (I), R can be $C_8$ to $C_{20}$ alkyl, M can be silicon, and X can be OR', wherein R' is $C_1$ to $C_2$ alkyl.

Suitable non-limiting examples of such hydrophobating agents can include octyltriethoxysilane, dodecyltriethoxysilane, and hexadecyltriethoxysilane, as well as the methoxy- and chloro-version of the aforementioned silanes.

Mixtures of any of the foregoing hydrophobating agents can be used.

Additionally, any of the previously described aqueous slurry compositions also can comprise one or more coupling agents, such as any of those selected from the group consisting of mercaptoorganometallic compounds, sulfur-containing organometallic compounds, non-sulfur organometallic compounds, and mixtures thereof.

For example, the mercaptoorganometallic compound used as a coupling agent in the method of the present invention can be represented by the following graphic formula II:

$$HS\text{—}R^2\text{—}M\begin{matrix}(L)_n \\ \diagdown \\ Q_{(3-n)}\end{matrix} \qquad \text{II}$$

wherein M is silicon, L is halogen or $\text{—}OR^3$, Q is hydrogen, $C_1$-$C_{12}$ alkyl, or halo substituted $C_1$-$C_{12}$ alkyl, $R^2$ is $C_1$-$C_{12}$ alkylene, $R^3$ is $C_1$-$C_{12}$ alkyl or alkoxyalkyl containing from 2 to 12 carbon atoms, said halogen or (halo) groups being chloro, bromo, iodo or fluoro, and n is 1, 2 or 3. $R^2$ is preferably $C_1$-$C_3$ alkylene e.g., methylene, ethylene, and propylene, $R^3$ is preferably $C_1$-$C_4$ alkyl, more preferably methyl and ethyl, L is preferably —OR$^3$, and n is preferably 3. Mercaptoorganometallic reactants having two mercapto groups may also be used.

Mercaptoorganometallic compounds in which the mercapto group is blocked, i.e., the mercapto hydrogen atom is replaced by another group, may also be used. The blocked mercaptoorganometallic compounds may have an unsaturated heteroatom or carbon bound directly to sulfur via a single bond. Examples of specific blocking groups can include, but are not limited to, thiocarboxylate ester, dithiocarbamate ester, thiosulfonate ester, thiosulfate ester, thiophosphate ester, thiophosphonate ester, and thiophosphinate ester.

When reaction of the mixture to "couple" the filler to the polymeric matrix into which it is incorporated is desired, a deblocking agent can be added to the mixture to deblock the blocked mercaptoorganometallic compound. If water and/or alcohol are present in the mixture, a catalyst, e.g., tertiary amines, Lewis acids or thiols, may be used to initiate and promote the loss of the blocking group by hydrolysis or alcoholysis to liberate the corresponding mercaptoorganometallic compounds. Procedures for preparing and using such compounds, e.g., blocked mercaptosilanes, are disclosed in PCT Publication WO 99/09036 at page 3, line 6, to page 28, line 28, the recited portion of which is incorporated by reference herein. Other procedures for preparing blocked mercaptosilanes are disclosed in U.S. Pat. No. 3,692,812 at column 1, line 36, to column 7, line 65, and U.S. Pat. No. 3,922,436 at column 2, line 18 to column 11, line 10, the recited portions of which are incorporated herein by reference.

Examples of useful mercaptoorganometallic compound(s) can include but are not limited to mercaptomethyltrimethoxysilane, mercaptoethyltrimethoxysilane, mercaptopropyltrimethoxysilane, mercaptomethyltriethoxysilane, mercaptoethyltripropoxysilane, mercaptopropyltriethoxysilane, (mercaptomethyl)dimethylethoxysilane, (mercaptomethyl)methyldiethoxysilane, 3-mercaptopropyl-methyldimethoxysilane and mixtures thereof. Specific suitable mercaptoorganometallic compounds can include mercaptopropyltrimethoxysilane, mercaptopropyltriethoxysilane, or mixtures there.

Examples of useful blocked mercaptosilanes can include but are not limited to 2-triethoxysilyl-1-ethyl thioacetate, 3-trimethoxy-silyl-1-propyl thiooctoate, bis-(3-triethoxysilyl-1-propyl)-methyldithiophosphonate, 3-triethoxysilyl-1-propyldimethylthiophosphinate, 3-triethoxysilyl-1-propyl-methylthiosulfate, 3-triethoxysilyl-1-propyltoluenethiosulfonate, and mixtures thereof.

The non-sulfur organometallic compounds that may be used as a coupling agent in the method of the present invention may be at least one non-sulfur organometallic compound or a mixture of non-sulfur organometallic compounds selected from the group consisting of:

organometallic compound(s) represented by formula III:

$$R^4_b MX_{(4-b)} \quad\quad\quad III$$

organometallic compound(s) represented by formula IV:

$$R^5_{(2c+2)}Si_cO_{(c-1)} \quad\quad\quad IV$$

organometallic compound(s) represented by the formula V:

$$R^6_{2d}Si_dO_d \quad\quad\quad V$$

and organometallic compound(s) represented by formula VI:

$$(R^5_3Si)_k NR^7_{(3-k)} \quad\quad\quad VI$$

wherein each M is independently silicon, titanium or zirconium; each R$^4$ is independently a hydrocarbon group containing from 1 to 18 carbon atoms or R$^4$ can be an organofunctional hydrocarbon group containing from 1 to 12 carbon atoms where, for example, the functionality is amino, carboxylic acid, carbinol ester, or amido; each X is independently selected from the group consisting of halogen, amino, alkoxy groups having from 1 to 12 carbon atoms, and acyloxy groups of from 1 to 12 carbon atoms, and b is the integer 1, 2 or 3; each R$^5$ is independently halo, hydroxy, or a hydrocarbon group containing from 1 to 18 carbon atoms with the proviso that at least 50 mole percent of the R$^5$ substituents are hydrocarbon groups containing from 1 to 18 carbon atoms, c is an integer from 2 to 10,000; each R$^6$ is independently halo, hydroxy, or a hydrocarbon group containing from 1 to 18 carbon atoms and d is an integer from 3 to 20; each R$^7$ is independently hydrogen or a hydrocarbon group containing from 1 to 18 carbon atoms and k is 1 or 2; and the halogen or (halo) groups are selected from chloro, bromo, iodo or fluoro. In the definition of the substituents shown in formulae III, IV, V, and VI like symbols have the same meaning unless stated otherwise.

In formula III, each R$^4$ can be a saturated or unsaturated monovalent hydrocarbon group or a substituted or non-substituted monovalent hydrocarbon group. R$^4$ can be, for example, an alkyl group such as methyl, ethyl, propyl, iso-propyl, iso-butyl, t-butyl, n-butyl, pentyl, hexyl, heptyl, octyl, nonyl, decyl, and dodecyl; an alkenyl group such as vinyl, allyl, and hexenyl; a substituted alkyl group such as chloromethyl, 3,3,3-trifluoropropyl, and 6-chlorohexyl; a cycloalkyl group, such as cyclohexyl and cyclooctyl; an aryl group such as phenyl and naphthyl; or a substituted aryl group such as benzyl, tolyl and ethylphenyl.

When X is a halogen in formula III, the halogen can be, for example, chloro. When X is an alkoxy group, X can be, for example, methoxy, ethoxy, or propoxy. When X is an acyloxy group, X can be, for example, acetoxy. Generally, X can be selected from the group consisting of chloro and methoxy.

The viscosity of the aforedescribed organometallic compounds is not limiting and can range from that of a fluid to a gum. Generally, higher molecular weight organometallic compounds can be cleaved by the acidic conditions of the chemical modification step allowing them to react with the hydrophilic inorganic oxide.

In formulae IV, V, and VI each R$^5$, R$^6$, and R$^7$ can be the same as the hydrocarbon groups described for R$^4$. For purposes of the present invention, when the organometallic reactant is an organosilicon reactant, the silicon is considered to be a metal.

The non-sulfur organometallic compound(s) can be represented by formulae III, IV, V, VI, or a mixture of said organometallic compounds wherein each M is silicon. Further, the non-sulfur organometallic can be represented by formula III wherein R$^4$ is C$_1$-C$_6$ alkyl, X is chloro and b is 2.

Examples of useful organosilicon compounds can include, but are not limited to, compounds and mixtures of compounds selected from the group consisting of diethyldichlorosilane, allylmethyldichlorosilane, methylphenyldichlorosilane, phenylethyldiethoxysilane, 3,3,3-trifluoropropylmethyldichlorosilane, trimethylbutoxysilane, sym-diphenyltetramethyldisiloxane, trivinyltrimethyl-cyclotrisiloxane, octamethylcyclotetrasiloxane, hexaethyldisiloxane, pentylmethyldichlorosilane, divinyldipropoxysilane, vinyldimethylchlorosilane, vinylmethyldichlorosilane, vinyldimethylmethoxysilane, trimethylchlorosilane, trimethylmethoxysilane, trimethylethoxysilane, methyltrichlorosilane, methyltrimethoxysilane, methyltriethoxysilane, hexamethyldisiloxane, hexenylmethyldichlorosilane, hexenyldimethylchlorosilane, dimethylchlorosilane, dimethyldichlorosilane, dimethyldimethoxysilane, dimethyldiethoxysilane, hexamethyldisilazane, trivinyltrimethylcyclotrisilazane, polydimethylsiloxanes comprising 3 to about 20 dimethylsiloxy units and trimethylsiloxy or hydroxydimethylsiloxy endblocked poly(dimethylsiloxane) polymers having an apparent viscosity within the range of from 1 to 1,000 mPa·s at 25° C.

Examples of organotitanium compounds that may be used can include, but are not limited to, tetra($C_1$ to $C_{18}$)alkoxy titanate, methyl triethoxy titanium (iv), methyl titanium (iv) triisopropoxide, methyl titanium (iv) tributoxide, methyl titanium (iv) tri-t-butoxide, isopropyl titanium (iv) tributoxide, butyl titanium (iv) triethoxide, butyl titanium (iv) tributoxide, phenyl titanium (iv) triisopropoxide, phenyl titanium (iv) tributoxide, phenyl titanium (iv) triisobutoxide, [Ti($CH_2Ph)_3(NC_5H_{10})$] and [Ti($CH_2SiMe_3)_2(NEt_2)_2$].

Examples of organozirconium compounds that may be used include, but are not limited to, tetra($C_1$-$C_{18}$)alkoxy zirconate, phenyl zirconium (iv) trichloride, methyl zirconium (iv) trichloride, ethyl zirconium (iv) trichloride, propyl zirconium (iv) trichloride, methyl zirconium (iv) tribromide, ethyl zirconium (iv) tribromide, propyl zirconium (iv) tribromide, chlorotripentyl zirconium (iv). Zirconium compounds similar to those described above for the organotitanium compounds and vice-versa are also contemplated.

The mercaptoorganometallic reactant may be replaced by a combination of a mercaptoorganometallic and a different sulfur-containing organometallic compound in a weight ratio of mercaptoorganometallic compound to sulfur-containing organometallic compound of from at least greater than 1:1, e.g., 1.01:1. The ratio may range from 1.01:1 to 100:1, such as from 5:1 to 50:1, or from 10:1 to 30:1, or the weight ratio may range between any combination of these values, inclusive of the recited values.

Examples of useful sulfur-containing organometallic compounds can include bis(alkoxysilylalkyl)-polysulfides described in U.S. Pat. No. 3,873,489 at column 2, line 26, to column 6, line 56, and U.S. Pat. No. 5,580,919 at column 11, lines 9 to 41, which disclosures are incorporated herein by reference. Such compounds are represented by the following formula VII:

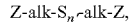

Z-alk-$S_{n'}$-alk-Z,  VII in which alk is a divalent hydrocarbon radical having from 1 to 18, preferably 1 to 6, and more preferably, 2 to 3, carbon atoms; n' is a whole number of 2 to 12, preferably 2 to 6 and more preferably 3 to 4; and Z is:

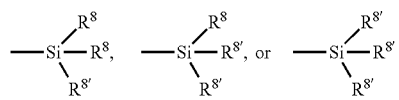

wherein $R^8$ is an alkyl group having from 1 to 4 carbon atoms or phenyl, and $R^{8'}$ is an alkoxy group having from 1 to 8, preferably 1 to 4, more preferably 1 to 2, carbon atoms, a cycloalkoxy group with from 5 to 8 carbon atoms, or a straight or branched chain alkylmercapto group with from 1 to 8 carbon atoms. The $R^8$ and $R^{8'}$ groups can be the same or different. The divalent alk group can be straight or branched chain, a saturated or unsaturated aliphatic hydrocarbon group or a cyclic hydrocarbon group. The high purity organosilane disulfides disclosed in U.S. Pat. No. 5,580,919 require that 80 percent of n' in formula VII is 2.

Examples of the bis(alkoxysilylalkyl)-polysulfides can include the bis(2-trialkoxysilylethyl)-polysulfide in which the trialkoxy group is trimethoxy, triethoxy, tri(methylethoxy), tripropoxy, tributoxy, etc. up to trioctyloxy and the polysulfide is the di-, tri-, tetra-, penta-, and hexasulfide. The corresponding bis(3-trialkoxysilylpropyl)-, bis(3-trialkoxysilylisobutyl), -bis(4-trialkoxysilylbutyl)-, and the like up to bis(6-trialkoxysilyl-hexyl)polysulfide also can be used. The relatively simply constructed organosilanes including the bis(3-trimethoxy-, -triethoxy-, and -tripropoxysilyl-propyl)polysulfide; namely, the di-, tri- and tetrasulfides can be used.

Specific examples of such bis(alkoxysilylalkyl)-polysulfides are described in column 6, lines 5 to 55 of the aforesaid U.S. Pat. No. 3,873,489, and in column 11, lines 11 to 41 of U.S. Pat. No. 5,580,919. Representative non-limiting examples of such compounds can include:

3,3'bis(trimethoxysilylpropyl)disulfide,
3,3'-bis(triethoxysilylpropyl)tetrasulfide,
3,3'-bis(trimethoxysilylpropyl)tetrasulfide,
2,2'-bis(triethoxysilylethyl)tetrasulfide,
3,3'-bis(trimethoxysilylpropyl)trisulfide,
3,3'-bis(triethoxysilylpropyl)trisulfide,
3,3'-bis(tributoxysilylpropyl)disulfide,
3,3'-bis(trimethoxysilylpropyl)hexasulfide, and
3,3'-bis(trioctoxysilylpropyl)tetrasulfide and mixtures thereof.

The compound 3,3'-bis(triethoxysilylpropyl)tetrasulfide (TESPT) is often used.

TESPT is available under the trade name "Si-69" from Degussa Corp. It is reported to be a mixture of 3,3'-bis(triethoxysilylpropyl)monosulfide, 3,3'-bis(triethoxysilylpropyl)disulfide, 3,3'-bis(triethoxysilylpropyl)trisulfide, 3,3'-bis(triethoxysilylpropyl)tetrasulfide and higher sulfide homologues having an average sulfide of 3.5.

In the method of the present invention, the acidified aqueous slurry (a) can further comprise a coupling agent selected from the group consisting of mercaptopropyltriethoxysilane, 3,3'-bis(triethoxysilylpropyl)disulfide, 3,3'-bis(triethoxysilylpropyl)polysulfides, and mixtures thereof.

The modified inorganic filler prepared by the method of the present invention can be prepared using any of a variety of methods known in the art. For example, the modified filler can be prepared by combining an aqueous solution of soluble metal silicate with acid solution to form an acidified aqueous slurry; the silica slurry optionally can be aged; acid or base can be added to the silica slurry to adjust pH of the slurry; the silica slurry is filtered, and washed, and then dried using conventional techniques known to a skilled artisan. For example, the modified filler can be dried by rotary drying techniques and/or spray drying techniques. The emulsifier material (2) and the hydrophobating agent (3) generally are added to the slurry prior to washing, but also may be incorporated at any step in the above-described process prior to drying. Further detailed description of the method for forming the modified filler (e.g., silica) can be found herein below in the Examples.

Suitable metal silicates can include a wide variety of materials known in the art. Non-limiting examples can include but are not limited to alumina, lithium, sodium, potassium silicate, and mixtures thereof. Also, the metal silicate can be represented by the following structural formula: $M_2O(SiO_2)_x$ wherein M is alumina, lithium, sodium or potassium, and x is an integer from 1 to 4.

Suitable acids can be selected from a wide variety of acids known in the art. Non-limiting examples can include but are not limited to mineral acids, organic acids, carbonic acid (carbon dioxide) and mixtures thereof. Typically, sulfuric acid is used.

As aforementioned, the modified fillers which are prepared by the method of the present invention are especially suitable for inclusion in organic polymeric compositions, e.g., any organic polymeric composition in which the treated filler advantageously can be included. The treated filler materials prepared by the process of the present invention are especially useful in rubber compounding compositions and, in particular, rubber compositions used in the manufacture of tires and tire components such as tire treads.

Such polymers are described in Kirk Othmer Encyclopedia of Chemical Technology, Fourth Edition, 1996, Volume 19, pp 881-904, which description is herein incorporated by reference. The treated filler of the present invention can be admixed with the polymer or the polymerizable components thereof while the physical form of the polymer or polymerizable components is in any liquid or compoundable form such as a solution, suspension, latex, dispersion, and the like. The polymeric compositions containing the treated filler of the present invention may be milled, mixed, molded and cured, by any manner known in the art, to form a polymeric article. Suitable polymers can include but are not limited to thermoplastic and thermosetting resins, rubber compounds and other polymers having elastomeric properties.

The aforementioned polymers can include, for example, alkyd resins, oil modified alkyd resins, unsaturated polyesters, natural oils (e.g., linseed, tung, soybean), epoxides, nylons, thermoplastic polyester (e.g., polyethyleneterephthalate, polybutyleneterephthalate), polycarbonates, i.e., thermoplastic and thermoset, polyethylenes, polybutylenes, polystyrenes, polypropylenes, ethylene propylene co- and terpolymers, acrylics (homopolymer and copolymers of acrylic acid, acrylates, methacrylates, acrylamides, their salts, hydrohalides, etc.), phenolic resins, polyoxymethylene (homopolymers and copolymers), polyurethanes, polysulfones, polysulfide rubbers, nitrocelluloses, vinyl butyrates, vinyls (vinyl chloride and/or vinyl acetate containing polymers), ethyl cellulose, the cellulose acetates and butyrates, viscose rayon, shellac, waxes, ethylene copolymers (e.g., ethylene-vinyl acetate copolymers, ethylene-acrylic acid copolymers, ethyleneacrylate copolymers), organic rubbers (both synthetic and natural rubbers) and the like.

The amount of modified filler that can be used in a polymeric composition can vary widely depending upon the polymeric composition and the desired properties of the article to be formed from the polymeric composition. For example, the amount of modified filler present in the polymeric composition can range from 5 up to 70 weight percent, based on the total weight of the polymeric composition.

The polymeric composition can comprise an organic rubber. Non-limiting examples of such rubbers can include but are not limited to natural rubber; those formed from the homopolymerization of butadiene and its homologues and derivatives such as: cis-1,4-polyisoprene; 3,4-polyisoprene; cis-1,4-polybutadiene; trans-1,4-polybutadiene; 1,2-polybutadiene; and those formed from the copolymerization of butadiene and its homologues and derivatives with one or more copolymerizable monomers containing ethylenic unsaturation such as styrene and its derivatives, vinyl-pyridine and its derivatives, acrylonitrile, isobutylene and alkyl-substituted acrylates such as methyl methacrylate. Further non-limiting examples can include styrene-butadiene copolymer rubber composed of various percentages of styrene and butadiene and employing the various isomers of butadiene as desired (hereinafter "SBR"); terpolymers of styrene, isoprene and butadiene polymers, and their various isomers; acrylonitrile-based copolymer and terpolymer rubber compositions; and isobutylene-based rubber compositions; or a mixture thereof, as described in, for example, U.S. Pat. Nos. 4,530,959; 4,616,065; 4,748,199; 4,866,131; 4,894,420; 4,925,894; 5,082,901; and 5,162,409.

Non-limiting examples of suitable organic polymers can include copolymers of ethylene with other high alpha olefins such as propylene, butene-1 and pentene-1 and a diene monomer. The organic polymers can be block, random, or sequential and can be prepared by methods known in the art, such as but not limited to emulsion (e.g. e-SBR) or solution polymerization processes (e.g., s-SBR). Further non-limiting examples of polymers for use in the present invention can include those which are partially or fully functionalized including coupled or star-branched polymers. Additional non-limiting examples of functionalized organic rubbers can include polychloroprene, chlorobutyl and bromobutyl rubber as well as brominated isobutylene-co-paramethylstyrene rubber. In a non-limiting embodiment, the organic rubber can be polybutadiene, s-SBR and mixtures thereof.

The polymeric composition can be a curable rubber. The term "curable rubber" is intended to include natural rubber and its various raw and reclaimed forms as well as various synthetic rubbers. The curable rubber also can include combinations of SBR and butadiene rubber (BR), SBR, BR and natural rubber and any other combinations of materials previously disclosed as organic rubbers. In the description of this invention, the terms "rubber", "elastomer" and "rubbery elastomer" can be used interchangeably, unless indicated otherwise. The terms "rubber composition", "compounded rubber" and "rubber compound" are used interchangeably to refer to rubber which has been blended or mixed with various ingredients and materials, and such terms are well-known to those having skill in the rubber mixing or rubber compounding art.

Rubber compositions comprising the modified filler produced by the method of the present invention can be used in the manufacture of a myriad of rubber articles, for example, a tire at least one component of which, e.g., the tread, comprises the cured rubber composition, as well as other rubber articles such as shoe soles, hoses, seals, cable jackets, gaskets, belts, and the like. Rubber compositions comprising the treated filler produced by the process of the present invention are particularly advantageous for use in the manufacture of tire treads exhibiting low roiling resistance and high wear resistance, especially when the tire treads are based on natural rubber. Moreover, it has been observed that lower cure temperatures can be achieved for such natural rubber compositions containing the treated filler produced by the process of the present invention.

The present invention is more particularly described in the following examples, which are intended to be illustrative only, since numerous modifications and variations therein will be apparent to those skilled in the art. Unless otherwise specified, all parts and all percentages are by weight.

EXAMPLES

Comparative Example 1

No Emulsifier Added

A precipitated silica was produced by acidifying a sodium silicate solution with sulfuric acid. The majority of the precipitate was formed at a pH above 8.5. Further precipitate was produced by continuing the acid addition until the solution pH reached a level of about 3.5. While the contents of the vessel were stirred, 10% of bis (alkoxysilylalkyl) polysulfide (Si69) relative to the total amount of silica produced on a dry basis was added over a 10-minute period. Once the addition was completed, 10% of n-octadecyltrimethoxysilane (ODMS purchased from Gelest) was added over another 10-minute period.

The precipitated silica was washed in a filter press to eliminate residual salts until the rinse water demonstrated a conductivity level of from about 300 to 800 microsiemens. The resulting filter cake was re-liquefied using a high shear agitator to form a solid in liquid suspension. The suspension was dried in a Niro spray drier (inlet temperature about 360° C. and outlet temperature about 110° C.). After drying, the treated silica powder was granulated.

Example 2

A treated silica was prepared exactly as in Example 1, but prior to the addition of Si69, 1 g/L of emulsifier was added in the reactor. The emulsifier used was sodium stearate.

It can be seen in Table 1 below that the carbon content of Example 2 is much higher than that of Comparative Example 1. This indicates that the octadecyltrimethoxysilane was incorporated much more efficiently when using the method in accordance with the present invention, than in the method of Comparative Example 1.

TABLE 1

|  | Comparative Example 1 | Example 2 |
| --- | --- | --- |
| Long chain silane | ODMS | ODMS |
| Emulsifier | none | sodium stearate |
| Long chain silane loading (%) | 6 | 5 |
| Emulsifier loading (%) | — | 1 |
| Sulfur (%) | 1.24 | 1.40 |
| Carbon (%) | 3.1 | 4.79 |

The weight percent carbon (C) and sulfur (S) values reported in the examples of this application were determined using a Flash 2000 elemental analyzer. This system was set up to monitor carbon and sulfur. Typical parameters included: the combustion furnace being set to 950° C., the GC oven temperature being set to 65° C., the carrier helium gas flow rate being set to 140 mL/min, the reference helium gas flow rate being set to 100 mL/min, the oxygen flow rate being set to 250 mL/min and oxygen injection time of 5 seconds. For each run, calibration standards, samples, and controls were typically run. To each 8-10 mg of vanadium pentoxide ($V_2O_5$) was added. The sample size was between 2-4 mg and they were sealed in tin capsules prior to analysis. If the control standard was not within ±10% relative of the known accepted value or the samples run in duplicate do not match (±5% relative), the entire sample run was reanalyzed.

Rubber Compounding

A rubber compound was prepared using the model passenger tread formulation listed in Table 2 below. Since the silica samples from Comparative Example 1 and Example 2 were treated, no additional silane was added during mixing for these rubber compounds. The rubber compound designated as Control Example A in Table 2 below included untreated silica (HI-SIL EZ160G) commercially available from PPG Industries. Comparative Example B included the treated silica of Comparative Example 1 which was prepared using no emulsifier, and Example C included the treated silica of Example 2 prepared in accordance with the present invention.

TABLE 2

Rubber Formulations

|  | Control Example A (untreated silica) | Comparative Example B (treated silica of Comparative Example 1) | Example C (treated silica of Example 2) |
| --- | --- | --- | --- |
| Buna VSL 5228-2[1] | 103.10 | 103.10 | 103.10 |
| Budene 1207[2] | 25.00 | 25.00 | 25.00 |
| Silica | 80.00 | 86.40 | 86.40 |
| Vivatec 500 US[3] | 5.00 | 5.00 | 5.00 |
| Zinc Oxide[4] | 2.50 | 2.50 | 2.50 |
| Stearic Acid[5] | 2.00 | 2.00 | 2.00 |
| Si 266[6] | 6.40 | — | — |
| Santoflex 13[7] | 1.50 | 1.50 | 1.50 |
| Rubber Makers Sulfur[8] | 1.50 | 1.50 | 1.50 |
| CBS[9] | 3.00 | 3.00 | 3.00 |
| DPG[10] | 1.50 | 1.50 | 1.50 |
| Total PHR: | 231.50 | 231.50 | 231.50 |

[1]Solution styrene-butadiene rubber (SSBR); vinyl content: 52%, styrene content: 28%, 27.3% TDAE oil, Mooney viscosity (ML(1 + 4 )100° C.: 50; obtained commercially from Arlanxeo.
[2]Butadiene rubber (BR); cis 1, 4 content 97%, Mooney viscosity (ML(1 + 4 )100° C.): 55; obtained commercially from The Goodyear Tire & Rubber Co.
[3]TDAE processing oil obtained commercially from Hansen & Rosental.
[4]Zinc oxide, Kadox ® 720C obtained commercially from Zinc Corporation of America.
[5]Rubber grade stearic acid obtained commercially from R. E. Carroll.
[6]3,3'-bis(triethoxy-silylpropyl)disulfide obtained commercially from Momentive.
[7]Santoflex 13, N-(1,3-dimethylbutyl)-N'-phenyl-p-phenylenediamine antiozonant, obtained commercially from Harwick Standard.
[8]Rubber Makers Sulfur, 100% active, obtained commercially from Taber, Inc.
[9]N-cyclohexyl-2-benzothiazolesulfenamide obtained commercially from Flexsys.
[10]Diphenylguanidine, obtained commercially from Monsanto.

The compound was mixed in a 1.89 L Kobelco Steward Bolling Inc. mixer equipped with 4-wing rotors and using a fill factor of 67%. The formulation was mixed using two non-productive passes, allowing the compound to cool between passes, followed by a productive pass where the curatives were added. For the first pass, the mixer rotors speed was set to 60 rpm and the components of Charge 1 were added to the mixer during the first 60 seconds of mixing. After 60 seconds into the mix cycle, the components of Charge 2 were added in the mixer. The first pass was dropped at four minutes from the starting of the mixing, at which point the mixing temperature had reached about 160° C. For the second pass the mixer rotors speed was kept at 60 rpm, and the cooled $1^{st}$ pass Masterbatch was added during the first minute of mixing, slowly to avoid stalling the mixer. The second pass was dropped at four minutes when a drop temperature of about 160° C. was reached. For the final pass, the mixer speed was kept at 40 rpm, and the cooled $2^{nd}$ pass Masterbatch was added during the first minute of mixing, slowly to avoid stalling the mixer. After adding the Masterbatch, Charge 3 was added. The second pass was dropped at three minutes when a drop temperature of about 100° C. had been reached. The resulting rubber composition was cured at 150° C. for a time sufficient to reach 90% of the maximum torque obtained using the oscillating Disk Rheometer (90% ODR) plus 5 minutes ($T_{90}$+5 minutes).

Rubber Testing

The resulting vulcanizates were tested for various physical properties in accordance with standard ASTM procedures. Table 3 below shows rubber compound properties.

TABLE 3

Rubber Compound Properties

| Rubber Compound | Control Example A | Comparative Example B | Example C |
|---|---|---|---|
| Filler | Untreated Hi-SIL EZ160G | Comparative Example 1 | Example 2 |
| ML(1 + 4) | 78 | 120 | 93 |
| S' Max | 28.9 | 33.2 | 30.2 |
| S' Min | 5.3 | 9.2 | 6.4 |
| MH-ML | 23.7 | 24.0 | 23.8 |
| TC50 | 19.0 | 14.8 | 12.7 |
| % Dispersion | 72 | 91 | 90 |
| Tensile, MPa | 5.2 | 16.2 | 14.9 |
| Elongation, % | 744 | 704 | 411 |
| Modulus @ 100%, MPa | 1.0 | 1.9 | 3.2 |
| Modulus @ 300%, MPa | 2.0 | 6.1 | 11.4 |
| 300/100% Modulus ratio | 1.9 | 3.3 | 3.6 |
| Hardness @ 23° C. | 67 | 71 | 65 |
| Hardness @ 100° C. | 63 | 65 | 64 |
| Rebound @ 23° C., % | 25 | 26 | 28 |
| Rebound @ 100° C., % | 63 | 58 | 64 |
| G' @ 60° C., MPa | 3.50 | 3.49 | 2.90 |
| Tan ($\delta$) @ 60° C. | 0.152 | 0.136 | 0.105 |
| G' @ 1.0%, 30° C., MPa | 6.10 | 5.13 | 4.23 |
| Tan ($\delta$) @ 30° C., 8% Mpa | 0.206 | 0.204 | 0.152 |

The data presented in Table 3 above illustrate that while both modified silica samples provided improved dispersion over the untreated silica, the modified silica of Example 2 prepared in accordance with the method of the present invention provided lower filler-filler interaction, as indicated by a lower G' value, and reduced hysteresis, as indicated by a lower tan $\delta$ value.

The present invention has been described with reference to specific details of particular embodiments thereof. It is not intended that such details be regarded as limitations upon the scope of the invention except insofar as to the extent that they are included in the accompanying claims.

The invention claimed is:

1. A method for preparing a modified filler, the method comprising in sequence:
    (a) providing an acidified aqueous slurry comprising:
        (1) an untreated inorganic filler which has not been previously dried;
        (2) an emulsifier material selected from the group consisting of fatty acids, salts of fatty acids, alkyl sarcosinates, salts of alkyl sarcosinates, and mixtures thereof; and
        (3) a hydrophobating agent having the following structural formula (I):

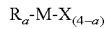

$$R_a\text{-M-X}_{(4-a)} \qquad (I)$$

wherein:
R is $C_6$ to $C_{22}$ alkyl,
M is silicon, titanium or zirconium,
X is OR' or halogen,
R' is $C_1$ to $C_4$ alkyl, and
a is 1;
    (b) washing and/or filtering the acidified aqueous slurry of (a) to obtain a modified filler; and
    (c) optionally, drying the modified filler.

2. The method of claim 1, wherein the untreated inorganic filler (1) comprises an inorganic oxide.

3. The method of claim 1, wherein the untreated inorganic filler (1) is selected from the group consisting of aluminum silicate, silica gel, colloidal silica, precipitated silica, and mixtures thereof.

4. The method of any claim 3, wherein the untreated filler (1) comprises precipitated silica.

5. The method of claim 1, wherein the emulsifier material (2) is selected from the group consisting of sodium stearate, ammonium stearate, ammonium cocoate, sodium laurate, sodium cocyl sarcosinate, sodium lauroyl sarcosinate, sodium soap of tallow, sodium soap of coconut, sodium myristoyl sarcosinate, stearoyl sarcosine acid, and mixtures thereof.

6. The method of claim 1, wherein the emulsifier material (2) is present in the aqueous slurry in an amount ranging from greater than 0 percent up to and including 0.25 percent by weight based on total weight of the slurry.

7. The method of claim 1, wherein in structural formula (I) R is $C_8$ to $C_{20}$ alkyl, M is silicon, and X is OR', wherein R' is $C_1$ to $C_2$ alkyl.

8. The method of claim 1, wherein the acidified aqueous slurry further comprises a coupling agent selected from the group consisting of mercaptoorganometallic compounds, sulfur-containing organometallic compounds, non-sulfur organometallic compounds, and mixtures thereof.

9. The method of claim 8, wherein the coupling agent is selected from the group consisting of mercaptopropyltriethoxysilane, 3,3'-bis(triethoxysilylpropyl)disulfide, 3,3'-bis(triethoxysilylpropyl)polysulfides, and mixtures thereof.

10. The method of claim 1, wherein the modified filler is dried by rotary drying techniques and/or spray drying techniques.

11. A modified filler prepared by the method of claim 1.

12. A polymeric composition comprising the modified filler of claim 11.

13. The polymeric composition of claim 12 which is a rubber composition.

14. An article comprising the polymeric composition of claim 12.

15. The article of claim 14, wherein the article is a tire.

* * * * *